United States Patent [19]

Kato

[11] Patent Number: 4,621,352

[45] Date of Patent: * Nov. 4, 1986

[54] OPTICAL MEMORY DEVICE

[75] Inventor: Kiichi Kato, Tokyo, Japan

[73] Assignee: Olympus Optical Co., Ltd., Tokyo, Japan

[ * ] Notice: The portion of the term of this patent subsequent to Nov. 19, 2002 has been disclaimed.

[21] Appl. No.: 746,459

[22] Filed: Jun. 19, 1985

Related U.S. Application Data

[63] Continuation of Ser. No. 454,263, Dec. 29, 1982, abandoned.

[30] Foreign Application Priority Data

Jan. 11, 1982 [JP] Japan ................................. 57-2493

[51] Int. Cl.$^4$ .......................... G11B 27/36; G11B 7/00
[52] U.S. Cl. .................................... 369/54; 369/58; 369/46
[58] Field of Search ..................... 369/54, 58, 46, 120, 369/109, 111, 112

[56] References Cited

U.S. PATENT DOCUMENTS

| | | | |
|---|---|---|---|
| 4,065,786 | 12/1977 | Stewart | 369/110 |
| 4,171,879 | 10/1979 | Bricot | 369/46 |
| 4,225,873 | 9/1980 | Winslow | 369/58 |
| 4,283,777 | 8/1981 | Curry | 369/109 |
| 4,355,318 | 10/1982 | Miyauchi | 369/54 |
| 4,399,529 | 8/1983 | Leterme | 369/112 |
| 4,426,693 | 1/1984 | Satoh | 369/116 |
| 4,554,654 | 11/1985 | Kato | 369/58 |

FOREIGN PATENT DOCUMENTS 55-153133 11/1980 Japan .

Primary Examiner—Alan Faber
Attorney, Agent, or Firm—Frishauf, Holtz, Goodman & Woodward

[57] ABSTRACT

An optical memory device comprises a modulator for modulating a laser beam in accordance with recording data, an objective lens for focusing the output laser beam from the modulator on a recording medium, a photosensor arranged at the conjugate position with the focal point of the objective lens, and a judging circuit for detecting erroneous writing in accordance with an output from the photosensor and a source of the recording data. The photosensor is divided into first and second segments by a line which is perpendicular to a direction corresponding to relative movement of the focused light beam on the recording medium. The difference signal between the outputs from the first and second segments is supplied to the judging circuit.

5 Claims, 10 Drawing Figures

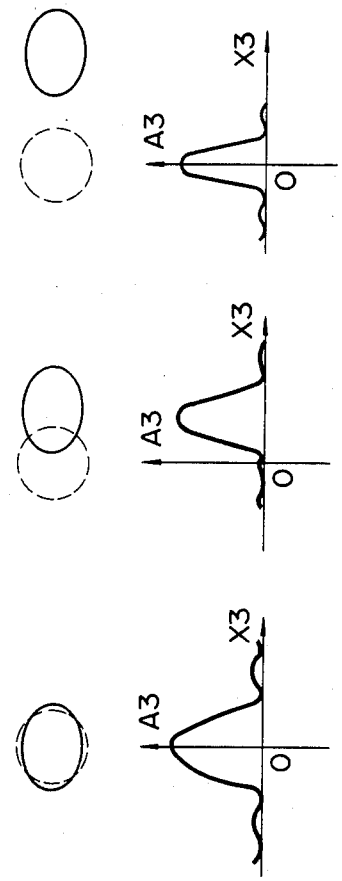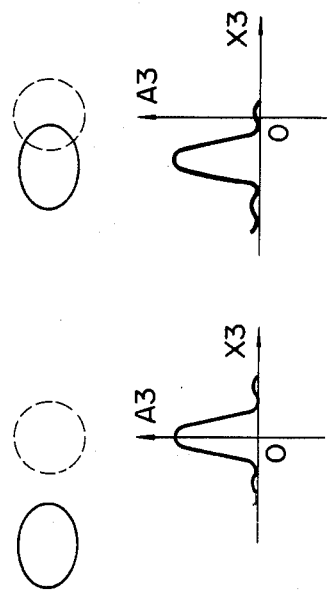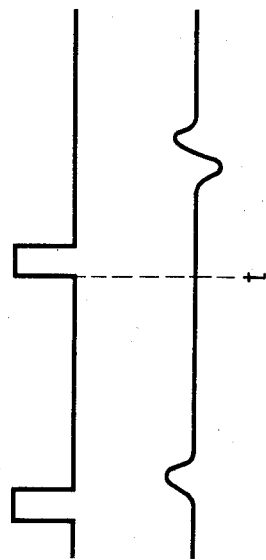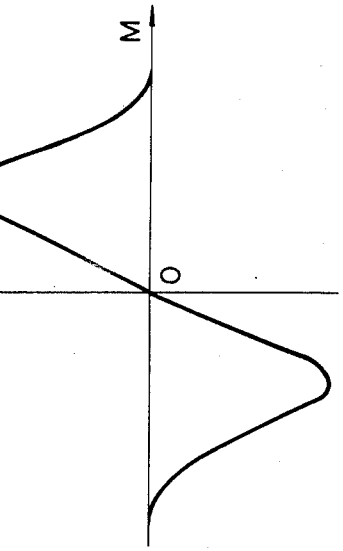

OPTICAL MEMORY DEVICE

This application is a continuation of application Ser. No. 454,263, filed Dec. 29, 1982, now abandoned.

BACKGROUND OF THE INVENTION

The present invention relates to an optical memory device and, more particularly, to an optical memory device which is capable of detecting an erroneous writing of data.

In an optical memory device, rows of pits are formed on the surface of an optical disc in accordance with recording data so as to write data. Pits are formed by evaporating the photosensitive material on the surface of the optical disc with a laser beam. Therefore, if the pits are not formed correctly or if there is a scratch or the like on the surface of the optical disc, data is erroneously written. In order to prevent this, a judgment must be made as to whether or not data has been correctly written. Detection of erroneous writing is conventionally performed utilizing light from the laser beam reflected off the optical disc. When a pit is formed, the reflectivity of the surface of the optical disc is varied to cause a level difference between the reflected light before and after pit formation, thus enabling detection of the presence or absence of the pit. If the level of the reflected light after the pit is formed is not lower than that of the reflected light before the pit is formed, even if a pit has been formed at the corresponding portion, correct formation of the pit has not occurred. Furthermore, if the level of the reflected light after the pit is formed is lower than that of the reflected light before the pit is formed, even if a pit has not actually been formed, it is probable that there is a scratch or the like on the optical disc. The reliability of the recording data is judged in this manner.

However, since it takes a considerable period of time after a writing laser beam is radiated before a pit is actually formed, the beam overlaps only half the pit. The level difference is not enough to detect erroneous writing. If the data writing speed is high, the overlapped portion becomes small and judgment reliability is degraded even further.

SUMMARY OF THE INVENTION

It is an object of the present invention to provide an optical memory device which is simple in structure and which is capable of accurately detecting erroneous writing due to defects of a recording medium or unsatisfactory writing.

The object of the present invention is achieved by an optical memory device comprising: a light source for radiating a light beam which is modulated in accordance with recording data; an objective lens for focusing the light beam from the light source onto a recording medium, the recording medium being arranged within a focal plane of the objective lens, and the recording medium moving relative to a focused light beam; a photosensor which is arranged at a conjugate position with a focal point of the objective lens and which has first and second segments extending along a direction of relative movement between the recording medium and the focused light beam; a subtractor for calculating a difference between outputs from the first and second segments of the photosensor; and a judging circuit for detecting erroneous writing in accordance with an output from the subtractor and the recording data.

BRIEF DESCRIPTION OF THE DRAWINGS

FIGS. 3A to 3E are representations showing changes in amplitude patterns on the detecting surface with changes in the positions of the laser beam and the pit;

FIG. 4 shows an output signal from a subtractor in relation to movement of the optical disc; and FIGS. 5A and 5B respectively show recording data and an output signal from the subtractor.

DETAILED DESCRIPTION OF THE PREFERRED EMBODIMENT

Figure 1:
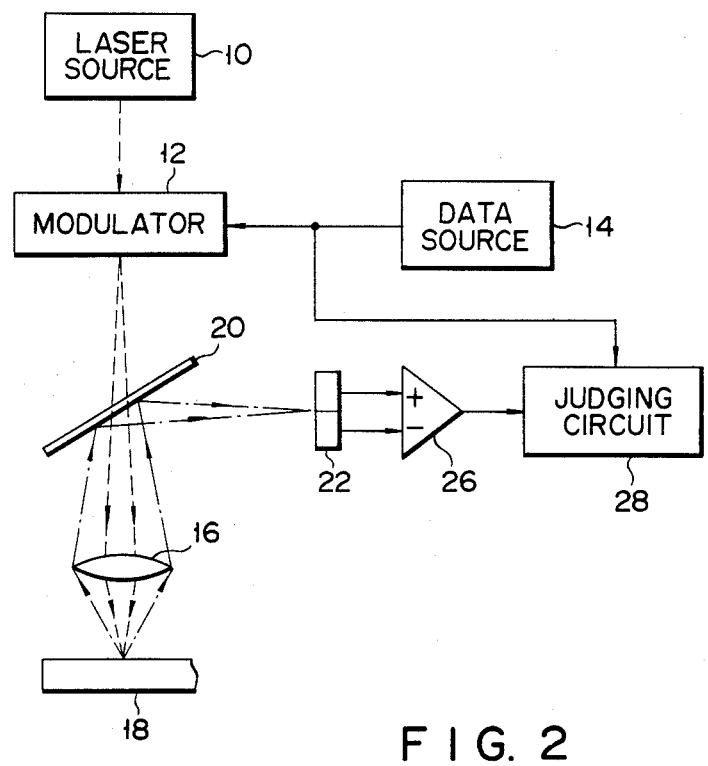
FIG. 1 is a block diagram of an optical memory device according to an embodiment of the present invention.
Figure 2:
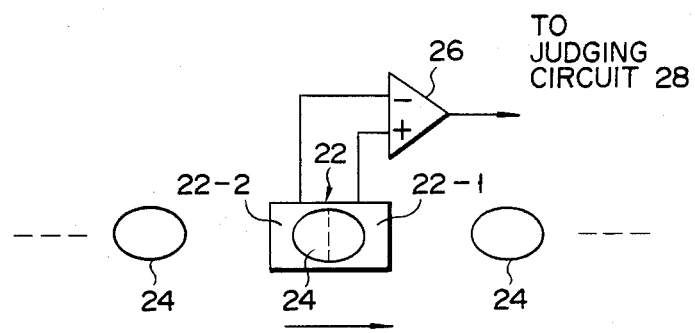
FIG. 2 is a view showing the relationship between the photosensor and the pits on the optical disc.

FIG. 1 is a block diagram of the device. A laser beam radiated from a laser source 10 is amplitude-modulated by a modulator 12 in accordance with recording data from a data source 14. Where a semiconductor laser is used as the laser source 10, it is unnecessary to provide the modulator 12. Output light from the modulator 12 is focused on the surface of an optical disc 18 (a recording medium) by an objective lens 16. The optical disc 18 is arranged in the focal plane of the objective lens 16. The optical disc 18 is rotating, as in the case of a general magnetic disc, to cause relative movement between the focused light beam and the optical disc 18, i.e., scanning. The optical disc 18 is prepared by coating a photosensitive, metal thin film on the surface of a plastic base film. A pit is formed by evaporating the metal thin film by a focused laser beam as a writing laser beam. A semitransparent mirror 20 is interposed between the modulator 12 and the objective lens 16. The semitransparent mirror 20 transmits light from the modulator 12 while it reflects light from the objective lens 16. Reflected light from the optical disc 18 becomes incident on the semitransparent mirror 20 through the objective lens 16 and is reflected thereby to change its optical path by about 90°. A photosensor 22 is arranged at a conjugate position with the focal point of the objective lens 16 and is in the optical path of the reflected light from the semitransparent mirror 20. The photosensor 22 converts incident light into an electric signal. The photosensor 22 is divided into two equal segments by a line perpendicular to the direction of movement of the optical disc 18. FIG. 2 shows the relationship between the photosensor 22 and pits 24 formed on the optical disc 18. The pits 24 are formed along the direction of movement of the optical disc 18 (indicated by the arrow). The photosensor 22 comprises two segments 22-1 and 22-2 which are aligned along the direction of movement of the optical disc 18. Outputs from the segments 22-1 and 22-2 of the photosensor 22 are respectively supplied to the positive and negative terminals of a differential amplifier 26 as a subtractor. An output from the differential amplifier 26 and an output from the data source 14 are supplied to a judging circuit 28.

The mode of operation of the device of this embodiment will now be described. While the optical disc 18 is rotated, recording data to be written are produced from the data source 14. The laser beam is amplitude-modulated in accordance with these data. When data "1" is to be written, the laser beam has a level which is the sum of the pedestal level and a predetermined level.

On the other hand, when data "0" is to be written, the laser beam remains at the pedestal level. Thus, writing of data "1" corresponds to formation of a pit, whereas writing of data "0" corresponds to non-formation of a pit. When the optical disc 18 is radiated with a writing laser beam, reflected light from the optical disc 18 is monitored by the photosensor 22.

The judgement method of the erroneous writing operation will now be described. When the objective lens 16 is focused on the optical disc 18, a one-dimensional amplitude pattern A2(X2) of the reflected light from the optical disc 18 on the surface of the objective lens 16 is given by:

$$A2(X2) = \int_{-\infty}^{\infty} A1(X1)\exp(-2\pi i \cdot X1 \cdot X2/\lambda)dX1 \quad (1)$$

$$\text{for } A1(X1) = \exp(-X1^2) \quad \text{Outside the pit} \\ A1(X1) = 0 \quad \text{Inside the pit} \quad (2)$$

where A1(X1) is an amplitude pattern of reflected light from the optical disc 18, X1 is a coordinate on each pit of the disc surface, X2 is a lens surface coordinate, $\lambda$ is the wavelength, and the intensity distribution of the laser beam is assumed to be a Gaussian distribution. One dimension corresponds to the dimension along the direction of movement of the optical disc 18.

Since the photosensor 22 is at a position conjugate with the focal point of the objective lens 16, an image of the optical disc 18 is formed on the detecting surface of the photosensor 22. An amplitude pattern A3(X3) of the reflected light on the detecting surface is expressed by:

$$A3(X3) = \int_{-d}^{d} A2(X2)\exp(-2\pi i \cdot X2 \cdot X3/\lambda)dX2 \quad (3)$$

where d is an aperture radius of the objective lens 16, and X3 is a coordinate on the detecting surface, projected images of X1, X2 and X3 on the optical disc being aligned along the direction of movement of the optical disc, i.e., along the direction of the row of pits.

When relations (1) and (2) are substituted in relation (3), the amplitude pattern of the reflected light on the detecting surface may be obtained in terms of the relationship between the positions of the writing laser beam spot and the pits, as shown in FIGS. 3A to 3E. In FIGS. 3A to 3E, the positional relationship between the writing laser beam spot (photosensor, shown by a dotted circle in the drawings) and the pit (solid elliptical) is shown in the upper half, while the one-dimensional amplitude pattern on the detecting surface is shown in the lower half. Note that the amplitude pattern is normalized. When the portion of the optical disc on which the pit is to be formed has not reached the writing beam spot or when it has passed beyond the writing beam spot, a symmetrical amplitude pattern about a detecting surface coordinate X3=0 appears on the detecting surface, as shown in FIGS. 3A and 3E. When part of the pit overlaps part of the writing beam spot, an amplitude shifted to the overlapping side is obtained, as shown in FIGS. 3B and 3D. When the center of the pit precisely coincides with that of the writing beam spot, an amplitude pattern on the detecting surface becomes symmetrical about the detecting surface coordinate X3=0. When the direction of movement of the optical disc 18 is from the negative to the positive direction on the coordinate axis, the amplitude pattern on the detecting surface changes as shown in FIGS. 3A, 3B, ..., 3E. The photosensor 22 is divided by a line which is perpendicular to the direction of movement of the optical disc, i.e., X3=0. The differential amplifier 26 produces an output signal D which is obtained by subtracting the output from the segment at the side of X3<0 from the output from the segment at the side of X3>0. The output signal D from the differential amplifier 26 for one pit changes in relation to the amount of movement of the optical disc 18, as shown in FIG. 4. M=0 corresponds to the state wherein the centers of the writing beam spot and the pit precisely coincide. M<0 is the state wherein the center of the writing beam spot is near the center of the pit, as shown in FIGS. 3A and 3B. M>0 is the state wherein the center of the writing beam spot is spaced apart from that of the pit, as shown in FIGS. 3D and 3E. When the writing beam spot does not overlap the pit at all or when the center of the writing beam spot completely overlaps that of the pit, the amplitude pattern on the detecting surface is symmetrical with respect to the line X3=0, and an output signal from the differential amplifier 26 is 0. In contrast to this, when the left half (X3<0) of the writing beam spot overlaps the pit, the amplitude pattern on the detecting surface is shifted in the negative direction, and an output from the differential amplifier 26 is negative. When the right half (X3>0) of the writing beam spot overlaps the pit, the amplitude pattern on the detecting surface is shifted in the positive direction, and an output signal from the differential amplifier 26 is positive.

When the photosensor 22 arranged on the conjugate position with the focal point of the objective lens 16 is divided into two equal segments by a line perpendicular to the direction of movement of the optical disc, the presence or absence of the pit may be confirmed by the waveform of a differential signal between the outputs from the two segments. Therefore, the judging circuit 28 can detect defective formation of the pit or a scratch on the optical disc by comparing an output from the data source 14 and an output from the differential amplifier 26. When a pit is formed by radiation with a laser beam, the timing of complete formation of the pit is delayed from the timing of radiation with the writing laser beam and the beam spot overlaps only half the pit. Therefore, in order to write data "1", the differential amplifier 26 produces the latter half (M>0) of the waveform shown in FIG. 4. FIGS. 5A and 5B show the relationship between the output waveform from the data source 14 and that from the differential amplifier 26. Until time t, the differential amplifier 26 produces the signal of the latter half of the waveform shown in FIG. 4 and a signal of logic level "0" in correspondence with the data "1" and "0", respectively. Therefore, it is judged that the writing operation has been correctly performed. After time t, even with the data "1" having been supplied to the modulator 12, the differential amplifier 26 produces a signal of logic level "0". Thus, formation of a pit is judged to have failed. Later, the output signal from the differential amplifier 26 has a waveform representing formation of a pit even with the data "0" being supplied to the modulator 12. Thus, a judgement is made such that a scratch or the like is present on the optical disc 18, and that data "1" was erroneously written due to the presence of this scratch.

According to the embodiment described above, since a differential output is utilized for judgement, judgement reliability is not subject to changes in the output from the laser source, i.e., changes in the intensity of the writing laser beam. Furthermore, since the differential output has a maximum amplitude when the centers of the photosensor 22 and the pit 24 deviate from each other, the timing of formation of a pit may be delayed from the timing of radiation of the writing laser beam. This allows reliable judgement and at a higher writing speed than with conventional devices.

In the embodiment described above, the photosensor is divided into two equal segments. However, the photosensor need not be equally divided, and only a differential output need be obtained. If the photosensor is not equally divided, the output waveform from the differential amplifier 26 shown in FIG. 4 only shifts transversely, and this may be adjusted by subsequent signal processing. The dividing line of the photosensor need not be perpendicular to the direction of movement of the optical disc but may be slightly inclined or may be a curve or a zigzag line. Two segments need only be aligned along the direction of movement of the optical disc.

In summary, the present invention provides an optical memory device which is simple in construction and which is capable of detecting erroneous writing of data with excellent reliability and response time.

What is claimed is:

1. An optical memory device for recording and reproducing signals on an amplitude detection type disc-type data recording medium, and which detects erroneous data writing, comprising:

radiating means for radiating a recording light beam which is modulated in accordance with recording data;

objective lens means for focusing the light beam from said radiating means onto said recording medium, said recording medium being arranged in a focal plane of said objective lens means, and said recording medium being movable relative to the focused light beam;

photosensing means for detecting the light beam radiated from said radiating means and reflected by the recording medium, said photosensing means being arranged at a focal point of said objective lens means and including first and second segments placed so that one follows the other along a direction corresponding to the direction of relative movement between said recording medium and the focused light beam;

subtracting means coupled to said photosensing means for calculating a difference between outputs from said first and second segments of said photosensing means, said first and said second segments and said subtracting means being operative so that said subtracting means produces an output corresponding to data recorded by the focused light beam on the recording medium after the data is recorded by said light beam and the recording medium moves relative to said light beam; and judging means coupled to the output of said subtracting means and to a source of the recording data for detecting an erroneous writing operation in accordance with the output from said subtracting means and the source of the recording data.

2. A device according to claim 1, in which said photosensing means is divided into said segments by a line which is perpendicular to the direction of relative movement between said recording medium and the focused light beam.

3. A device according to claim 2, in which said photosensing means is equally divided into said segments.

4. A device according to claim 1, in which a semi-transparent mirror is interposed between said radiating means and said objective lens means for transmitting light from said radiating means and for reflecting light from said objective lens means to change an optical path thereof by 90°, reflected light from said semitransparent mirror becoming incident on and focussed on said photosensing means.

5. A device according to claim 1, in which a pit is formed on a surface of said recording medium in accordance with the recording data, and said judging means judges that an erroneous writing operation has occurred if an output level from said subtracting means remains constant when the recording data indicates formation of the pit, and said judging means judges that an erroneous writing operation has occurred if the output level from said subtracting means changes when the recording data indicates non-formation of the pit.

* * * * *